United States Patent [19]

Thomas et al.

[11] Patent Number: 5,818,822
[45] Date of Patent: Oct. 6, 1998

[54] WIRELESS LOCAL AREA NETWORK HAVING INTERFACE AT EACH STATION WHICH IGNORES MESSAGES NOT RETRANSMITTED BY REPEATER

[75] Inventors: Gérard Thomas, Eragny S/Oise; Luc Brignol; Florence Christien, both of Paris, all of France

[73] Assignee: Alcatel N.V., Amsterdam

[21] Appl. No.: 341,216

[22] Filed: Dec. 5, 1994

[30] Foreign Application Priority Data

Dec. 6, 1993 [FR] France .................................. 93 14587

[51] Int. Cl.⁶ ....................................................... H04J 3/24
[52] U.S. Cl. ........................... 370/315; 370/310; 370/479; 370/492; 455/14; 455/55.1; 375/211
[58] Field of Search .................................. 370/94.1, 18, 93, 370/501, 492, 479, 256, 452, 315, 310; 375/200, 211, 285, 330; 455/33.1, 54.2, 55.1, 56.1, 14, 66, 465

[56] References Cited

U.S. PATENT DOCUMENTS

| | | | |
|---|---|---|---|
| 3,916,311 | 10/1975 | Martin et al. | 455/55.1 |
| 4,476,574 | 10/1984 | Struven | 455/14 |
| 4,837,788 | 6/1989 | Bird | 375/211 |
| 4,941,207 | 7/1990 | Maeda et al. | 455/55.1 |
| 4,972,505 | 11/1990 | Isberg | 455/55.1 |
| 5,025,452 | 6/1991 | Sohner et al. | 375/1 |
| 5,046,066 | 9/1991 | Messenger | 455/66 |
| 5,115,463 | 5/1992 | Moldavsky et al. | 455/465 |
| 5,251,213 | 10/1993 | Videlock et al. | 370/452 |
| 5,379,324 | 1/1995 | Mueller et al. | 375/330 |
| 5,386,470 | 1/1995 | Carter et al. | 375/211 |
| 5,388,126 | 2/1995 | Rypinski et al. | 375/285 |
| 5,400,333 | 3/1995 | Perlman | 370/256 |
| 5,410,738 | 4/1995 | Diepstraten et al. | 455/66 |
| 5,430,889 | 7/1995 | Hulbert et al. | 455/33.1 |
| 5,455,967 | 10/1995 | Amezawa et al. | 455/33.1 |

FOREIGN PATENT DOCUMENTS

| | | | |
|---|---|---|---|
| 0257947A2 | 3/1988 | European Pat. Off. | H04L 11/16 |
| 3140960A1 | 5/1983 | Germany | H04Q 9/00 |
| WO8807794 | 10/1988 | WIPO | H04L 11/16 |
| WO9115068 | 10/1991 | WIPO | H04K 1/00 |
| WO9210883 | 6/1992 | WIPO | H04B 5/00 |

OTHER PUBLICATIONS

D. Buchholz et al, "Wireless In–Building Network Architecture and Protocols", *IEEE Network: The Magazine of Computer Communications,* vol. 5, No. 6 Nov. 1991, pp. 31–38.

J. Mitzlaff, "Radio Propagation and Anti–Multipath Techniques in the WIN Environment", *IEEE Network: The Magazine of Computer Communications,* vol. 5, No. 6, Nov. 1991, pp. 21–26.

*Primary Examiner*—Douglas W. Olms
*Assistant Examiner*—Shick Hom
*Attorney, Agent, or Firm*—Sughrue, Mion, Zinn, Macpeak & Seas, PLLC

[57] ABSTRACT

A wireless local area network includes a plurality of stations each comprising a data processing machine connected to a radio send-receive interface. Each data processing machine includes an interface controller for sending a message containing an address designating a destination station and for receiving messages addressed to it. The network further includes a repeater including a radio send-receive interface connected to a radiating cable passing near all the stations to receive all messages sent by the stations, to modify these messages to indicate that the message has passed through the repeater and to retransmit these messages over the radiating cable. The radio send-receive interface of each station ignores any messages not sent by the repeater. The wireless local area network finds an application in computer networking.

16 Claims, 7 Drawing Sheets

WIRELESS LOCAL AREA NETWORK HAVING INTERFACE AT EACH STATION WHICH IGNORES MESSAGES NOT RETRANSMITTED BY REPEATER

BACKGROUND OF THE INVENTION

1. Field of the invention

The invention concerns a wireless local area network. A wireless local area network includes a plurality of stations each comprising a data processing machine connected to a radio send-receive interface.

2. Description of the prior art

In prior art wireless local area networks each station communicates directly with all the others, sending messages each including an address designating at least one destination station. The quality of the signal received by a station depends to a great degree on the distance between it and the station which sent the message and on obstacles encountered by the radio carrier wave between the source station and the destination station. The configuration of the room(s) and the furniture and the materials from which they are made condition the quality of transmission between stations and cannot be modified. It is merely possible to provide automatic gain control devices in the radio send-receive interfaces for dynamically compensating variations in the amplitude of the received signal.

Prior art wireless local area networks have the drawback of a bit rate limited to about only 2 Mbit/s. The bit rate is limited by the protocol for exchanging messages between stations. This protocol is slow because of problems due to radio transmission. These problems are as follows:

When a station receives a message the amplitude of the radio signal that it receives depends on the distance from the station sending the message and on attenuation and reflection caused by obstacles near the two stations concerned. The radio send-receive interface of each station therefore requires a time-delay to adjust its gain and to synchronize to the bits of a message.

Prior art wireless local area networks have no provision for using a protocol of the carrier detect and collision detect multiple access type in which, when a station wishes to send a message, it has to listen out to see if there is any station already sending a message on the same channel, send if no carrier is detected, and verify that the message sent is not disrupted by interference from another station which started to send at the same time. In the latter case each of the two stations starts to transmit its message again after a pseudo-random waiting time and after checking again that there is no carrier present. This type of protocol is very simple to implement and has the advantage of being fast and therefore of facilitating a high average bit rate.

On the other hand, prior art wireless local area networks cannot detect a collision as each station is incapable of detecting interference on a signal it is in the process of sending. The stations use a protocol which involves sending an acknowledgement message from the destination station to the source station once a message has been received correctly by the destination station. When a station has finished sending a message, to enable it to receive the acknowledgement, it must not send another message before a particular time-delay, which corresponds to the sum of the maximal message propagation time and the maximal acknowledgement propagation time.

An object of the invention is to propose a wireless local area network which can transmit data at a higher bit rate than prior art networks.

SUMMARY OF THE INVENTION

The invention consists in a wireless local area network including a plurality of stations each including means for sending and receiving radio messages and a repeater for retransmitting each message sent by a station, said repeater being connected to a radiating cable passing near all said stations, each station including means for processing only messages addressed to it and retransmitted by said repeater.

There are many fewer transmission problems with this kind of network than with prior art networks because the radiating cable passes near all the stations, without exception. The amplitude of the radio signal received by a station is not dependent on the distance between that station and the station which sent the signal, but is dependent on the distance between the radiating cable and each of these stations and on the attenuation along the radiating cable. This attenuation does not vary with time. The radio send-receive interfaces therefore receive radio signals having a much smaller dynamic range than signals received in a prior art type system.

The time needed to adjust the automatic gain control and synchronization devices can therefore be much shorter as the radio interfaces of the stations can be provided with automatic gain control devices having a much smaller dynamic range and therefore reacting more quickly. Accordingly, the bit rate is higher.

The network of the invention therefore remedies the main drawback of prior art wireless networks whilst retaining the advantage of great ease of modification of the network by addition, removal or movement of stations. Also, the installation cost for a radiating cable is much lower than that for a conventional cable installation as there is no jack for each station and the cable can run along each corridor without making a detour into each office.

In a preferred embodiment of the invention each station includes means for sending each message with a predetermined duration, said repeater includes means for retransmitting each message after a predetermined time-delay at least equal to the fixed message duration, and each station includes means for comparing a message received from said repeater after sending a message with the message that it sent and sending said message again with a pseudo-random time-delay if the comparison does not indicate that said messages are identical.

This network allows each station which has sent a message to check that there is no collision with other messages and that there are no transmission errors. It is therefore possible to use a protocol with no acknowledgement messages and therefore a much higher bit rate than is possible with the protocols used in prior art wireless local area networks.

The time interval between the messages sent by the same station not only enables the repeater to retransmit each message but also allows the addition to the message of information for controlling at least one of the station radio send-receive interfaces.

In a preferred embodiment of the invention the repeater includes means for adding to each message retransmitted binary information for controlling at least one station and each station includes means for receiving binary control information added to a message retransmitted by the repeater.

In accordance with another feature of the invention the repeater includes means for sending service messages to stations at its own initiative and each station includes means for executing an instruction contained in a service message addressed to it.

This network allows the repeater to send service messages, in particular for adjusting the power transmitted by each station.

In a preferred embodiment of the invention each station includes means for sending at a variable power level controlled by service messages sent to it by said repeater and said repeater includes means for determining said power in such a way as to achieve a given quality of transmission between said repeater and said station.

This network allows the power transmitted by each station to be optimized in order to minimize interference between a plurality of adjoining networks, combined with a given quality of transmission.

In accordance with one specific embodiment of the invention the repeater further includes means for connecting it to at least one cable local area network, said means sending at least some of the radio messages sent by the stations on said cable local area network, in the format corresponding thereto, and retransmitting messages from said cable network on said radiating cable.

This network allows at least two sub-networks to communicate: one comprises wireless LAN stations and the other comprises cable LAN stations. The latter can use a conventional protocol such as the ETHERNET protocol covered by IEEE standard 802.3.

Various means can be used to discriminate between messages sent by neighboring wireless local area networks in accordance with the invention. A first way is to have them send in separate frequency bands. In another embodiment of the invention:

the repeater includes means for adding to each message a binary word specific to the network;

all stations include means for detecting the binary word in each message received and ignoring messages which do not include the binary word specific to the network of which they are part.

This feature prevents a station of one network responding to messages from another network close to it and sending in the same frequency band. Of course, this feature does not prevent the possibility of collision between messages sent by the two networks, but any such collision is resolved by the usual mechanism for resolving collision between two stations of the same network.

The invention will be more clearly understood and other features of the invention will emerge from the following description of one embodiment of a network in accordance with the invention and the accompanying drawings.

DETAILED DESCRIPTION OF THE PREFERRED EMBODIMENTS

Figure 1:
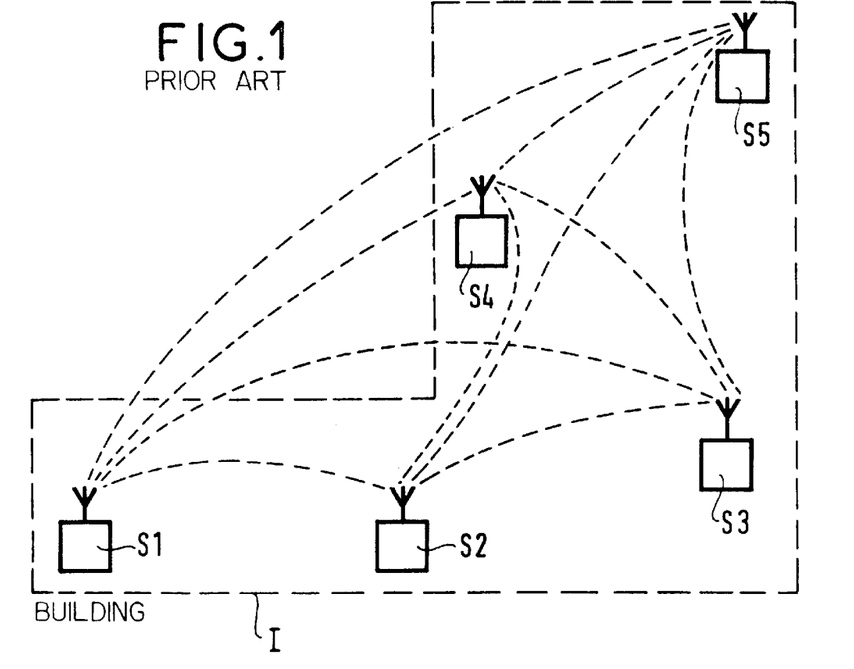
FIG. 1 is a block diagram of a prior art wireless local area network.

FIG. 1 shows the block diagram of a prior art wireless local area network. Five stations S1, . . . , S5 are located at various places in a building I. Each includes a terminal, for example, and a radio send-receive interface provided with an antenna enabling it to communicate with any other station. The dashed lines represent symbolically the radio links which can be established by the stations between them. This example shows that the radio links are of highly diverse lengths, depending on the geographical position of the stations. For example, messages sent by station S1 are received with a much greater amplitude by the nearby station S2 than by the distant station S5. Also, some stations may be in direct line of sight, for example the station S1 and the station S2. Other stations communicate through walls or partitions, for example the stations S1 and S5. The result is a wide variation in the amplitude of the signal as received by each station.

Figure 2:
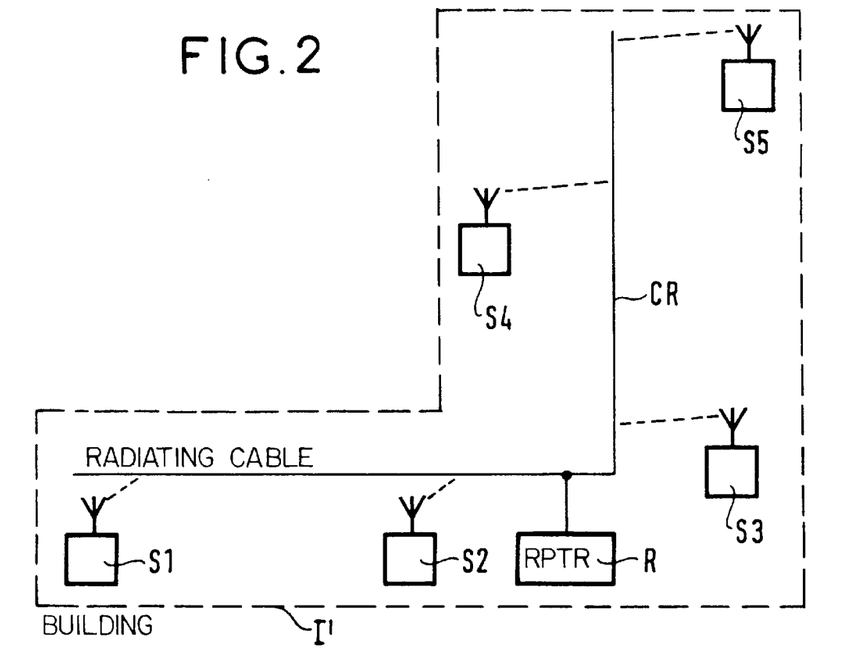
FIG. 2 is a block diagram of a wireless local area network of the invention.

FIG. 2 is a block diagram of one embodiment of network in accordance with the invention, in the case of a building I' identical to the building I and with stations S1, . . . , S5 having the same respective geographical positions as in the previous network. The network includes a radiating cable CR which is routed to all rooms, being fixed to the ceiling or to the partition walls, for example, parallel to the floor. The radiating cable CR is energized at a point approximately halfway along it by repeater R. The radiating cable CR is used to transmit and to receive alternately.

Each station S1, . . . , S5 includes an identical radio send-receive interface provided with an antenna which is bound to be located at a short distance from the radiating cable CR as the latter passes through all rooms. The stations are usually in direct line of sight of the radiating cable CR. When a station sends a radio signal conveying a message, the signal is received by the radiating cable CR and routed to the repeater R. The latter waits for the end of the message and then retransmits it by modulating a different radio signal fed to the radiating cable CR.

Propagation of a radio signal along the cable CR causes attenuation of the signal, but this attenuation is constant and can be determined. The stations therefore receive the radio signals with an amplitude which is much more nearly constant than in the case of direct radio transmission from station to station.

Figure 3:
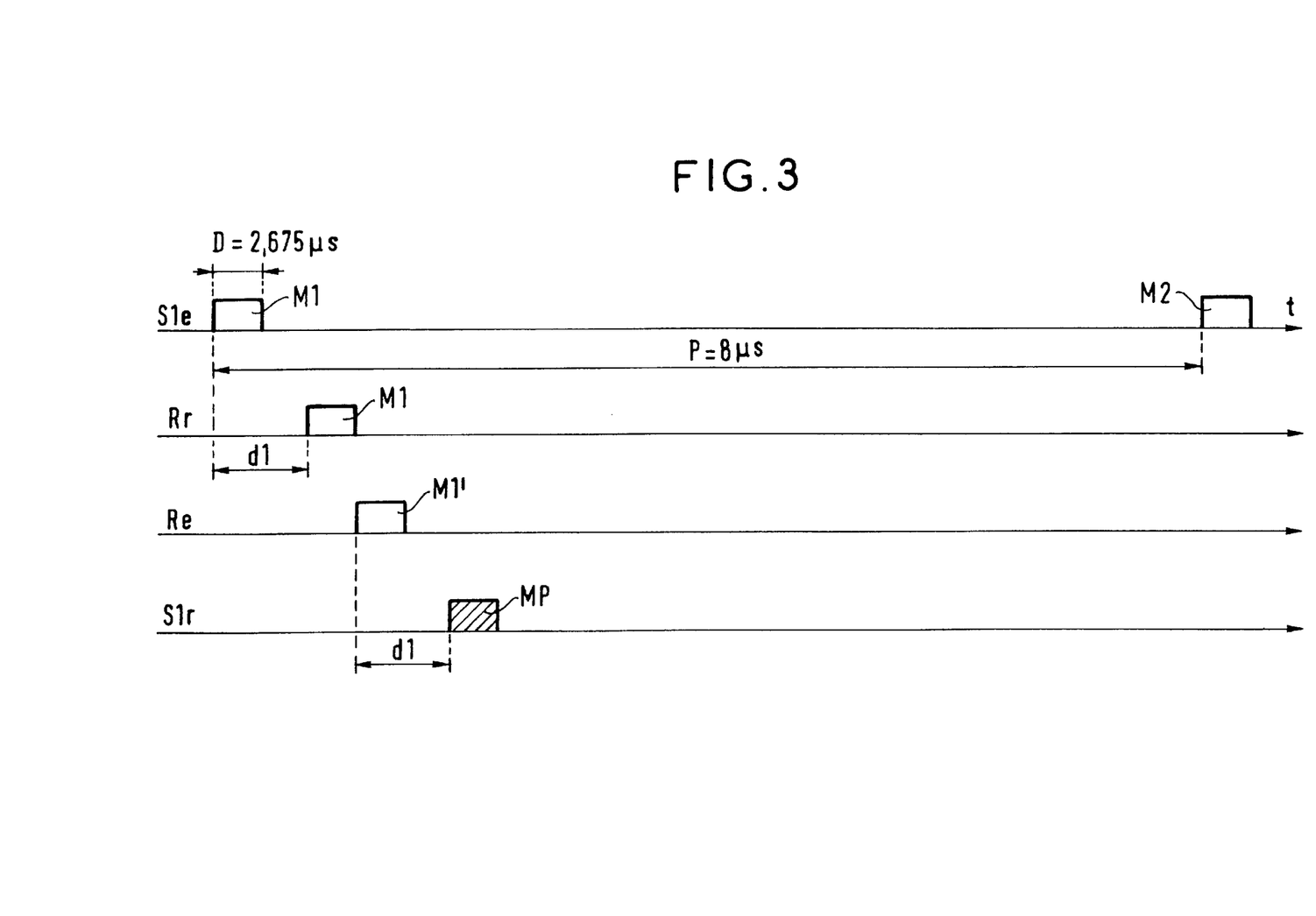
FIG. 3 shows timing diagrams illustrating the transmission of a message in this embodiment of network of the invention.

FIG. 3 is a timing diagram illustrating the protocol for transmitting a message in this embodiment of network in accordance with the invention. It shows in particular the situation in which the station which has sent a message detects collision between this message and a message sent at the same time and in the same frequency band by a different station. The line S1e shows the sending of two successive messages M1 and M2 by the same station, for example the station S1. Each of these messages has a duration set at 2.675 $\mu s$, for example. The time interval between the starts of two different and consecutive messages has a fixed duration P=8 µs. All the messages sent by the stations include (for example) 80 data bits supplied by the terminal of the station sending the message and 16 service bits supplied by the radio send-receive interface of the station. These service bits are used by the radio send-receive interfaces of the stations and the repeater to signal:

the direction in which the message is transmitted (to or from the repeater);

the nature of the message (data communication message; service message);

the identity of the network to which the station or the repeater sending the message belongs.

The line Rr represents reception of the message M1 by the repeater R after a time-delay d1 corresponding to propagation between station S1 and the repeater R, on the path in the radiating cable CR.

The line Re represents retransmitting of the message M1 by the repeater R. The repeater R retransmits the message M1 in the form of a message M1' after a time-delay equal to the fixed duration D of the message M1. It also modifies the content of the service bits in the message M1. At least one service bit is for distinguishing the message M1' from the message M1 coming direct from the station S1.

The line S1r represents detection of a collision between the message M1 and another message sent at the same time. The station S1 which sent the message M1 listens for the message M1' sent by the repeater R to check that the message M1 has been retransmitted without errors, especially errors due to in interference with another message being sent by another station. In this example the station S1 receives a message after the propagation time-delay D1. However, the message it receives is a message MP disrupted by interference which is not identical to the message M1 it sent. The station S1 then decides to defer the next message (M2) and to send message M1 again after a random waiting time in excess of 8 µs. This waiting time is to allow the network to revert to the idle state. The message M1' retransmitted by the repeater R is received by the destination station after a propagation time-delay d5 (not shown) between the repeater R and the destination station.

Note that the time interval P=8 µs between the sending of two different messages M1 and M2 by the same station S1 is chosen to be greater than the sum of the delays 2d1+d5 needed for complete reception of the message M1' by the destination station, given the maximal values of the propagation time-delays d1 and d5. For example, if these propagation time-delays have a maximum duration of 250 ns, corresponding to a distance of 50 m, the sum of the propagation delays in this example is equal to 1 µs at most, to which must be added the duration D=2.675 µs of the message M1'. In this example the total duration of transmission and reception of the message is therefore at most 3.675 µs. It therefore remains well below the time interval P=8 µs between two consecutive messages.

If each message M1, M2, etc contains 80 wanted bits, an interval P=8 µs enables a bit rate of 10 Mbit/s, which is significantly higher than the bit rate of 2 Mbit/s achieved by prior art wireless local area networks.

In one embodiment of the invention the repeater R can add to each message retransmitted a number of bits constituting an instruction for commanding the radio send-receive interface of the station to which the message with these bits added to it is addressed. The radio send-receive interface of the destination station recognizes its own address, transmits the message to the station, and executes the instruction contained in the bits added to the message. In a different embodiment of the invention the bits added to a message include an address designating the station which is the destination for the added bits, which can be a different station from the station to which the message is addressed, the latter being designated by another address in the message.

In one embodiment of the invention the repeater R can send service messages to the radio send-receive interfaces of the stations at its own initiative. A service message sent by the repeater R may include (for example) 80 bits representing an instruction and a station address and a bit indicating that this is a message from the repeater. By means of a service message or additional bits added to a retransmitted message, the repeater R can control the transmit power of the radio send-receive interface of each station to obtain a given quality of transmission between the repeater and that station. In the station-repeater direction this quality can be defined by imposing a particular amplitude on the signal received by the repeater, for example. In the repeater-station direction, to simplify management of the radio send-receive interface of the repeater R the transmit power can be constant for all stations.

The bits added to a retransmitted message by the repeater can include a binary word specific to the network. Each station then responds only to messages including the address of the station, a bit indicating that the message has been retransmitted by a repeater and the binary word specific to the network of which the station in question is part. This binary word prevents a station of the network in question responding accidentally to messages sent by the repeater of another nearby network sending in the same frequency band.

In a preferred embodiment of the invention the repeater and all the stations of a network of the invention send in the same frequency band, for example the band from 2.4 GHz to 2.5 GHz, by spread spectrum modulation of a carrier using a method spreading the spectrum over all of the bandwidth. This method can be of the direct sequence or of the frequency hopping type. In a preferred embodiment of the invention the carrier is direct sequence modulated by a correlator. A preferred embodiment of this correlator is an analog correlator implemented using a surface acoustic wave device.

Figure 4:
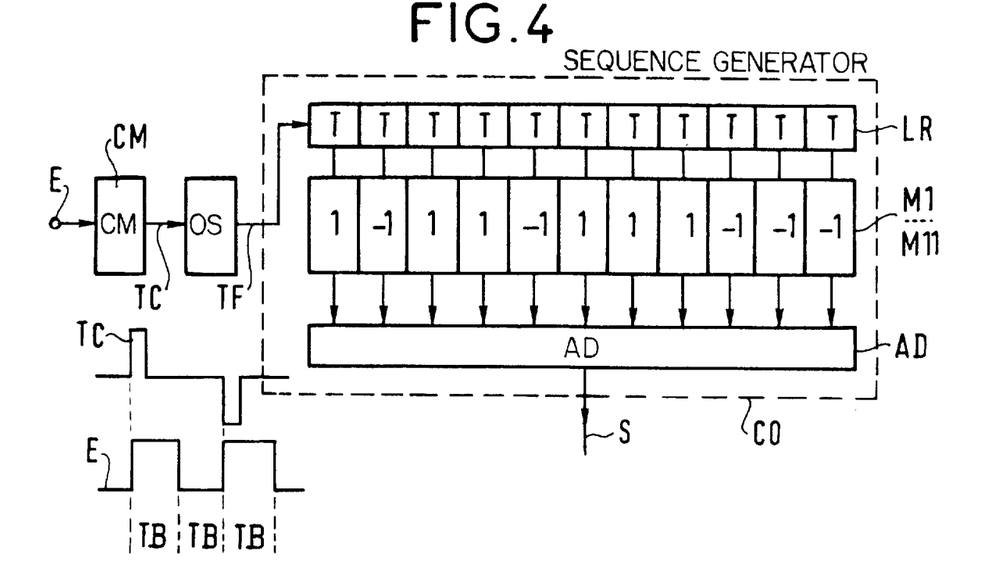
FIG. 4 is a block diagram showing the essential means used to send a message on a carrier wave in this embodiment of the invention.

FIG. 4 is a block diagram of the essential parts of a radio send-receive interface for producing a carrier wave modulated by a message.

These essential parts include:

a coder CM receiving a series of binary values E with a bit period TB and converting this series of values into a series of pulses TC according to a coding law described below;

a surface acoustic wave circuit OS which is a conventional filter supplying, when excited by a pulse input, a high-frequency signal having a Gaussian envelope and a duration T, this filter having an input connected to an output of the coder CM and an output supplying the high-frequency signal TF whose amplitude is on/off modulated by the signal TC from the coder CM; and a sequence generator CO comprising:

a delay line LR having an input connected to the output of the circuit OS and 11 outputs providing 11 respective time-delays with a constant pitch equal to T;

11 devices M1, . . . , M11 for multiplying the signals supplied by the 11 outputs of the delay line LR by a series of coefficients +1 or −1, which is equivalent to applying a phase-shift of 0° C. or 180°; and a device AD having 11 inputs each connected to a respective output of one of the devices M1, . . . , M11 and having an output supplying a high-frequency signal S which is modulated by the series of binary values E.

The series of coefficients +1 or −1 constitutes a Barker sequence. A Barker sequence has the property of producing a very marked correlation peak when it is detected by a transversal filter having coefficients corresponding to this sequence. In this example the Barker sequence used comprises 11 coefficients as follows:

1, −1, 1, 1, −1, 1, 1, 1, −1, −1, −1

There are a few other Barker sequences comprising 11 coefficients or 13 coefficients which can be used instead.

Each burst of the high-frequency signal TF delivered by the circuit OS is output by the 11 outputs of the delay line LR with increasing time-delays and is phase modulated by the devices M1, . . . , M11. The phase of the modulated signal is varied in 180° jumps. The device AD adds the bursts 11 modulated in this way.

The waveform from the circuit OS and in the Barker sequence generator CO depends on the polarity of the signal TC and thus the signal S is dependent on the series of values E.

The coder CM separates the series of binary values E, at the timing rate TB, into a series of even-rank bits and a series of odd-rank bits at the timing rate TB/2, two consecutive odd or even bits at 1 generating two pulses TC of opposite polarity and with a duration which is short in comparison with the duration TB. A zero state is represented by the absence of any pulse. The two series of pulses respectively corresponding to the even-rank bits and the odd-rank bits are interleaved and constitute a series of coding pulses at the timing rate TB.

Note that the pitch T of the delay line LR is equal to the duration TB of the period of the bits to be transmitted.

Figure 5:
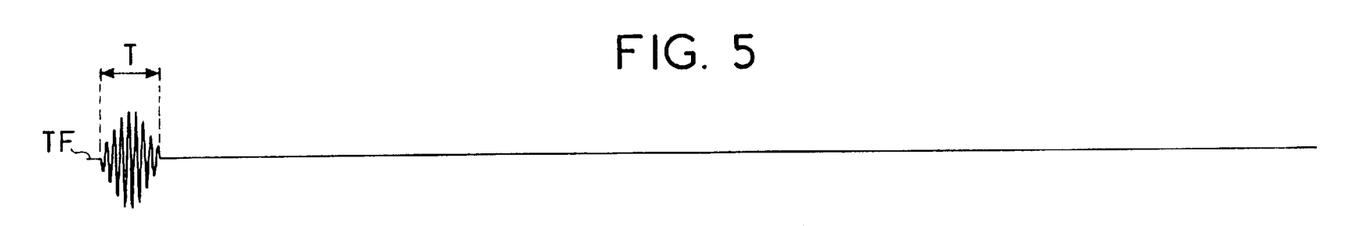
FIGS. 5 to 7 show oscillograms showing the operation of these essential means.

FIG. 5 shows the oscillogram of the signal TF supplied by the circuit OS to the generator CO for a single pulse of duration TB applied to the input of the coder CM. This is a high-frequency sinusoidal signal amplitude modulated by a Gaussian curve having a duration equal to the pitch T of the time-delays produced by the delay line LR.

Figure 6:
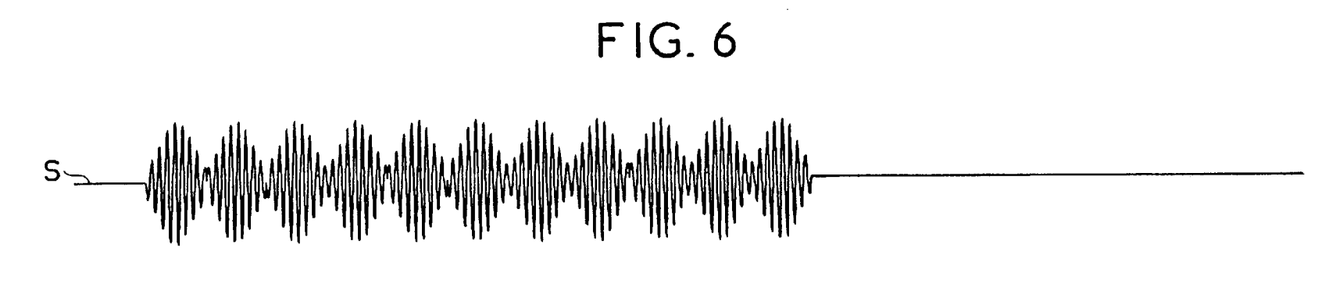

FIG. 6 is a graph showing the signal S supplied by the output of the sequence generator CO as a function of time. It is a high-frequency sinusoidal signal amplitude modulated eleven times in succession by a Gaussian curve having a duration equal to the pitch T of the time-delays produced by the delay line LR. It is also phase-modulated in 180° jumps when the signal has a null value. Because of the facility for obtaining a correlation peak from this modulated signal, the high-frequency signal modulated in this manner can be demodulated without recovering the carrier or recovering the clock of the transmitted bits. The modulated signal also has a spectrum spread over a wide frequency band, procuring the benefits of spread spectrum radio transmission, in particular reduced sensitivity to interference.

The modulation method described above has the advantage of enabling particularly simple demodulation using a correlator matched to the generator CO used for the modulation.

Figure 7:
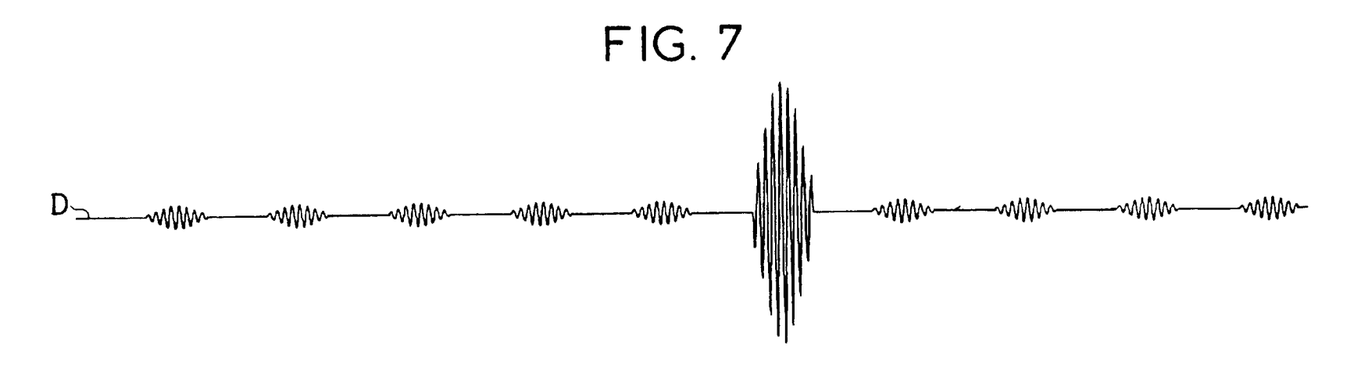

FIG. 7 is a graph showing the signal D supplied by the output of a correlator matched to the generator CO when the signal shown in FIG. 6 is supplied to the input of the matched correlator. After a time-delay equal to 11.T, a correlation peak occurs at the output of the correlator comprising a short burst of the high-frequency signal, with a duration less than T, while during the time intervals from 0 to 10.T and from 12.T to 22.T it supplies only bursts of negligible amplitude, equal to 1/11 if the value 11 is assigned to the correlation peak. It is therefore possible to detect a high-frequency signal modulated by a given Barker sequence to transmit a message consisting of only one bit.

Figure 8A:
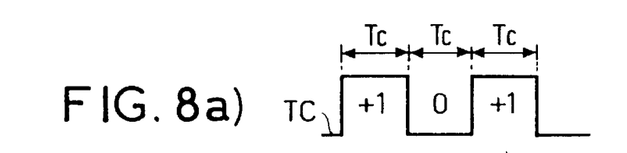
FIG. 8 shows oscillograms illustrating the detection of a signal sent by these essential means.
Figures 8B, 8C, 8D, 8E:
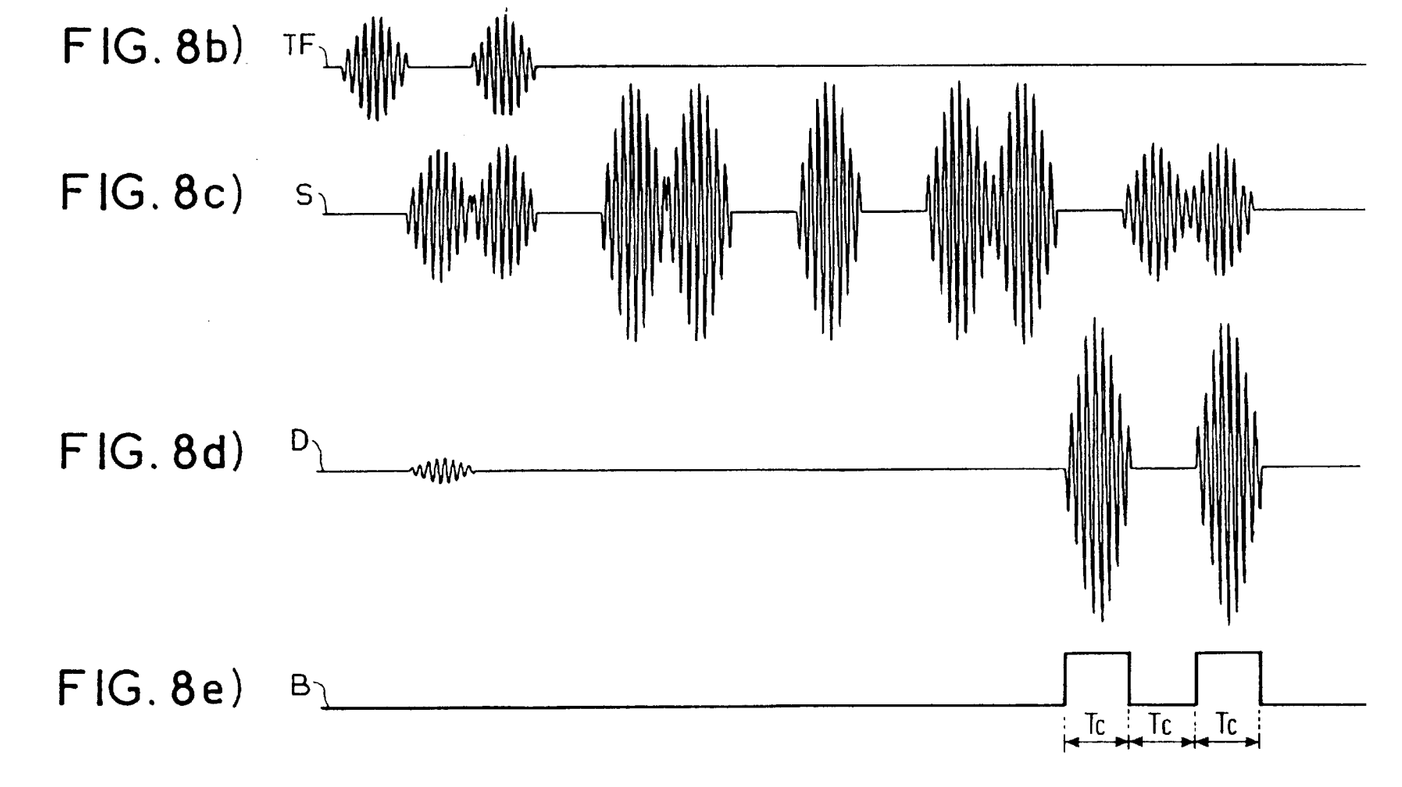

FIG. 8 shows timing diagrams illustrating the various stages of transmitting a message comprising several bits.

Consider, for example, a message which after coding by the coder CM is represented by two pulses of value +1 separated by a return to the value 0, each value having a duration $T_C$. The line a in FIG. 8 represents the signal TC supplied by the output of the coder CM and which therefore takes the values +1, 0, +1.

The line b represents the signal TF at the output of the circuit OS. It comprises two bursts of the each amplitude modulated high-frequency signal by a Gaussian curve and having a duration $T_C$. They are separated by a return to the value 0 for a duration $T_C$.

The line c represents the signal S at the output of the generator CO. This signal S comprises N bursts of amplitude modulated and phase modulated high-frequency signal with a total duration equal to $13.T_C$.

The line d represents the signal D supplied by the output of a matched correlator used in the repeater R to detect the signal S sent by a station. In this example the signal D comprises a negligible amplitude burst of the high-frequency signal followed by two high amplitude bursts of the high-frequency signal, the total duration of the signal D being $13.T_C$.

The line e represents a binary signal B obtained from the signal D by detecting its envelope and then comparing this envelope with a fixed threshold value. The signal B comprises two high-level pulses each of duration $T_C$ separated by a low-level interval of duration $T_C$. The signal B obtained in this way contains the binary information carried by the signal TC.

Figure 9:
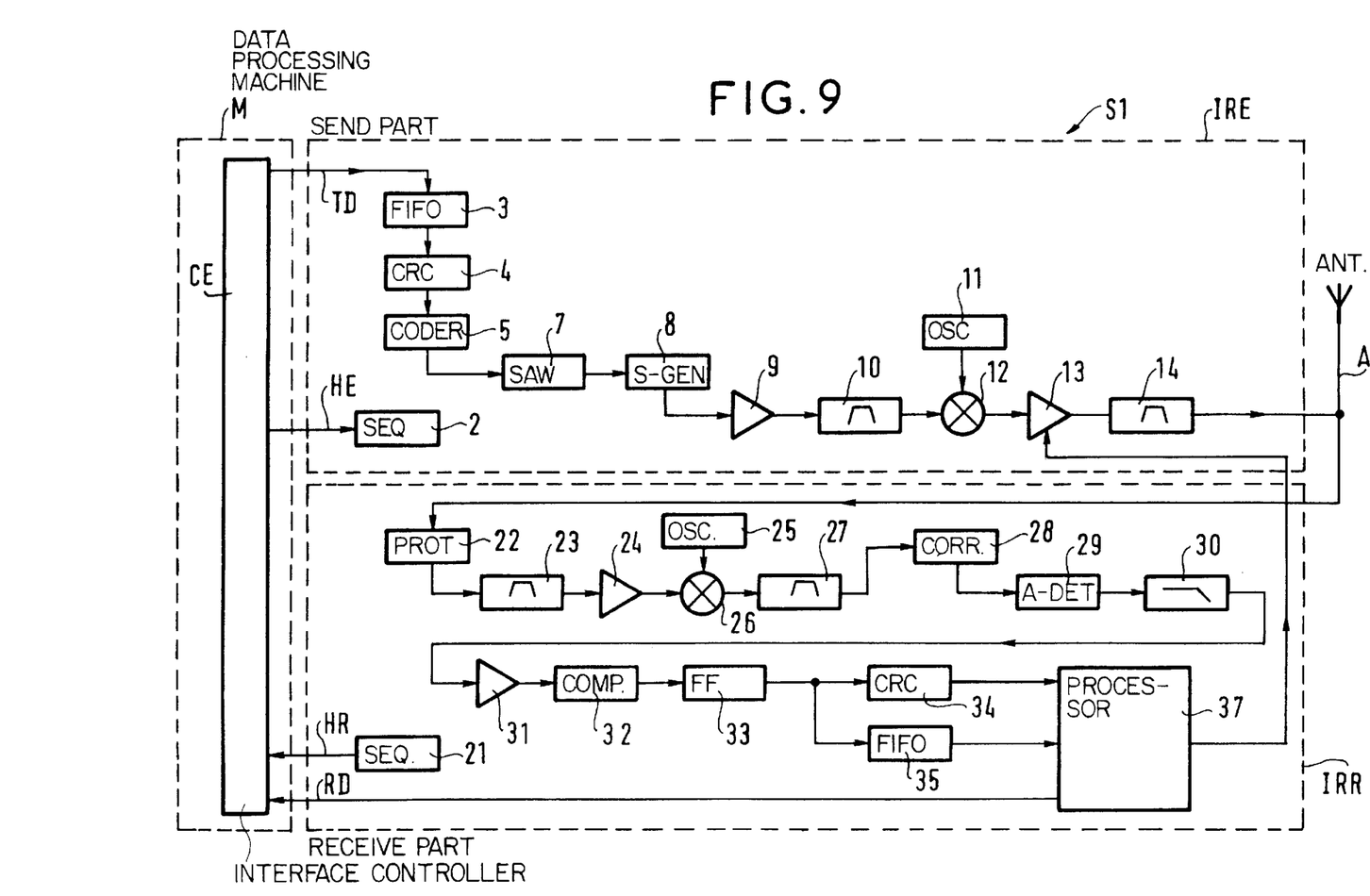
FIG. 9 is a block diagram of a station in this embodiment of the invention.

FIG. 9 is a the block diagram of a station, for example the station S1, in particular a block diagram of the send part IRE and the receive part IRR of the radio send-receive interface of the station. The station further includes a data processing machine M which incorporates an interface controller CE which can implement the IEEE 802.3 protocol and which is usually connected to a bus to constitute a local area network of the carrier detect and collision detect type. In this instance the interface controller CE has two outputs connected to respective inputs HE and TD of the send part IRE of the interface and two inputs connected to respective outputs HR and RD of the receive part IRR of the interface.

In one embodiment of the invention one function of the interface controller CE is to recognize the address of the station in a message. The radio send-receive interface of the station can therefore transmit to it all the messages sent by the repeater, without sorting them on the basis of the destination station address. The operation of the interface controller CE is slightly different from the operation of a conventional interface controller connected to a cable network as collision detection is not effected at the time a station sends a message, but rather at the time the message is retransmitted by the repeater, collisions being detected by verifying all of the message sent by the repeater after the sending by the station.

The duration $T_C$ of the bursts corresponding to respective transitions in the binary signal is made equal to the bit period TB. The pitch T of the delay lines of the modulator and demodulator correlators is made equal to the bit period TB. For example, TB=25 ns=$T_C$. Note that in this example a binary series with transitions every 25 ns is transmitted by applying to a correlator a series of bursts each having a duration of 25 ns with a period of 25 ns, while the propagation time in the delay line of the correlator is equal to 11×25 ns. Transmission of 80 bits therefore takes 2,000 ns +275 ns, the 275 ns representing dumping of the contents of the delay line of the sequence generator. The total duration is therefore 2,275 ns, to which must be added the duration of the 16 service bits with an individual duration of 25 ns, i.e. a total of 400 ns. The total message duration is therefore 2,675 ns. These transmissions repeat every 8 µs.

The send part IRE includes:

a sequencer 2 having an input connected to the input HE;

a first in/first out buffer 3 having an input connected to the input terminal TD which supplies a message to it;

a cyclic redundancy code computation device 4 having an input connected to an output of the buffer 3;

a coding device 5, for example a Manchester coding device, having an input connected to an output of the device 4;

a surface acoustic wave circuit 7 constituting a conventional filter supplying a burst of high-frequency signal with a Gaussian envelope and of duration T=25 ns and whose frequency is 320 MHz; this circuit has an input connected to an output of the device 5;

an 11-bit Barker sequence generator 8 having an input connected to an output of the circuit 7;

an amplifier 9 having an input connected to the output of the generator 8;

a bandpass filter 10 passing frequencies from 250 MHz to 400 MHz having an input connected to the output of the amplifier 9;

an oscillator 11 oscillating at a fixed frequency of 2.1 GHz;

a mixer 12 having an input connected to the output of the filter 10 and an input connected to the output of the oscillator 11, to transpose the modulated signal about the frequency of 2.45 GHz;

an amplifier 13 having an input connected to an output of the mixer 12 and a gain control input connected to an output of the receive part IRR;

a bandpass filter 14 passing frequencies from 2.4 GHz to 2.5 GHz having an input connected to the output of the amplifier 13 and having an output connected to an antenna A which is used to send and receive alternately.

The sequencer 2 is connected by connections that are not shown to the buffer 3 and to the devices 4 and 5 to synchronize their operation to a clock supplied by the interface controller CE at the input HE, at the same timing rate as the binary data it supplies to the input TD.

The receive part IRR includes:

a protection device 22 having an input connected to the antenna A and which is adapted to protect the receive part IRR against overvoltages due to sending by they send part IRE;

a bandpass filter 23 passing frequencies from 2.4 GHz to 2.5 GHz and having an input connected to an output of the protection device 22;

an amplifier 24 having an input connected to an output of the filter 23;

an oscillator 25 oscillating at a fixed frequency of 2.1 GHz and having a constant amplitude output;

a mixer 26 having an input connected to the output of the amplifier 24 and an input connected to the output of the oscillator 25, for transposing the frequency of the received signals;

a bandpass filter 27 passing frequencies from 250 MHz to 400 MHz and having an input connected to an output of the mixer 26;

an analog correlator 28 having an input connected to the output of the filter 27;

an amplitude detector device 29 having an input connected to an output of the correlator 28;

a lowpass filter 30 having a bandwidth limited to 40 MHz to output a signal representing the envelope of the correlation peak at the output of the correlator 28;

an amplifier 31 having an input connected to an output of the lowpass filter 30;

a comparator 32 having an input connected to an output of the amplifier 31 for reshaping the signal supplied by the amplifier 31;

a flip-flop 33 having an input connected to an output of the comparator 32 to sample the logic signal at this output at a time defined by a clock signal;

a cyclic redundancy code calculator device 34 having an input connected to the output of the flip-flop 33;

a first in/first out buffer 35 having an input connected to the output of the flip-flop 33;

a processor 37 having an input connected to an output of the device 34, an input connected to the output of the buffer 35, an output connected to the output terminal RD constituting the output of the receive part IRR and an output connected to a gain control input of the amplifier 13 in the send part IRE; and a sequencer 21 which is connected by connections that are not shown to the correlator 28, to the devices 33 through 35 and to the processor 37 to supply clock signals thereto and which is connected to the output terminal HR to supply a clock signal to the interface controller CE.

The processor 37 supplies a binary data stream constituting a message at the output RD at a timing rate defined by the sequencer 21. At the same time the sequencer 21 supplies a clock signal at the same timing rate at the output HR.

The generator 8 and the correlator 28 are matched to each other as they are designed for the same Barker sequence comprising 11 bits in this example. They are surface acoustic wave analog correlators. Each comprises a piezo-electric substrate on which electrodes are deposited. Each output of the delay line is constituted by one electrode, each time-delay being a propagation delay between two consecutive electrodes. The geometrical characteristics of each electrode determine the phase and the amplitude of the signal collected by it. Each electrode produces a phase-shift of 0° or 180°. The addition of the 11 signals collected by the 11 electrodes is simply achieved by connecting the electrodes to the same output.

This analog implementation is particularly simple as it is not necessary to recover the carrier frequency or the bit timing and as the correlator used for modulation is identical to the correlator used for demodulation. The change of frequency by means, of the oscillator 11 and the mixer 12 enables operation of the correlator 8 at a frequency below 800 MHz. Likewise, the change of frequency by means of the oscillator 25 and the mixer 26 enables operation of the correlator 28 at a frequency less than 800 MHz.

The processor 37 confers some processing capacity on the receive part. It retransmits to the output terminal RD each message that the buffer 35 supplies to it, after checking that the message includes the bit indicating that it has passed through the repeater R.

The processor 37 adds to each message an indicator showing whether the device 34 has detected an error or not. The interface controller CE is responsible for recognizing the address of the station in a receive message and for sending a message requesting a repeat of the message received if the device 34 has detected an error due to a collision, for example. In a different embodiment of the invention these functions can be handled by the processor 37 of the radio send-receive interface, which runs a suitable program.

Finally, the processor 37 interprets the control bits added by the repeater R to the messages sent by stations and interprets service messages sent by the repeater R. One network management function controls the power output of the amplifier 13 by adjusting its gain so that the repeater receives messages from that station with a given quality. The receiver of the repeater therefore operates with a smaller dynamic range and therefore under optimum conditions.

To enable a plurality of independent local area networks using the same frequency band to coexist in the same building, it is feasible to use a different Barker sequence for each network, as several different Barker sequences are known, comprising 11 or 13 bits. However, this solution has the drawback of requiring different analog correlators for each network, since the electrodes of each correlator have geometrical characteristics dependent on the Barker sequence used.

Another and preferable method is to send, in addition to the address of the destination station for a message, an address designating the network of which the destination station of the message is part. This network address can be added to the message by a control bit generator each time that a message is sent by the send part IRE of the radio send-receive interface. This bit generator can be connected to the input of the buffer 3 of the send part IRE of the interface. The network address is recognized by the processor 37 of the receive part IRR. The processor retransmits a message to the output terminal RD only if it recognizes the address of the network of which it is part.

The embodiment of the invention described above has the advantage of simplicity due to the use of analog correlators. A more complex alternative embodiment could include two digital correlators or another known type of spread spectrum modulator device.

Figure 10:
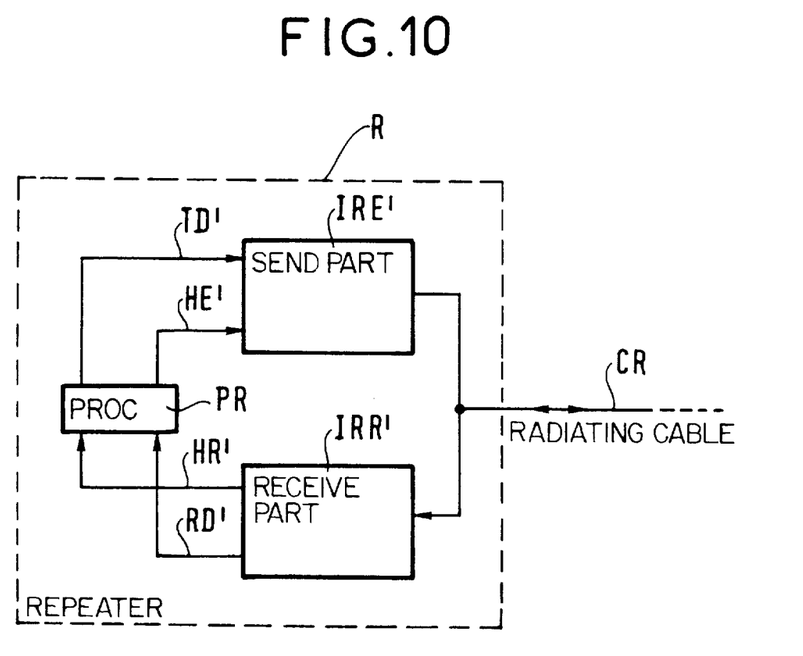
FIG. 10 is a block diagram of the repeater of this embodiment of the invention.

FIG. 10 is a block diagram of a repeater R. It includes a processor PR and a radio send-receive interface having a send part IRE' similar to the part IRE described above for a station and a receive part IRR' similar to the part IRR described above for a station. The send part IRE' and the receive part IRR' respectively have an output and an input connected to the radiating cable CR. The send part IRE' has two inputs TD' and HE' connected to respective outputs of the processor PR. The receive part IRR' has two outputs HR' and RD' connected to respective inputs of the processor PR.

When the receive part IRR' receives a message addressed to any station it supplies the series of binary values constituting this message to the output RD' and supplies a corresponding clock signal at its output HR'. The processor PR stores this message in an internal buffer for a time equal to the fixed message duration. After this time the message being received is complete and can therefore be retransmitted. The processor PR supplies this message to the input TD' of the send part IRE' and simultaneously supplies a clock signal at the input HE'. The processor PR adds to this message an additional bit B indicating that the message is retransmitted by the repeater. Other additional bits can be added to control the radio interface of the station to which the message is addressed. The processor PR can send service messages to the stations at its own initiative.

Figure 11:
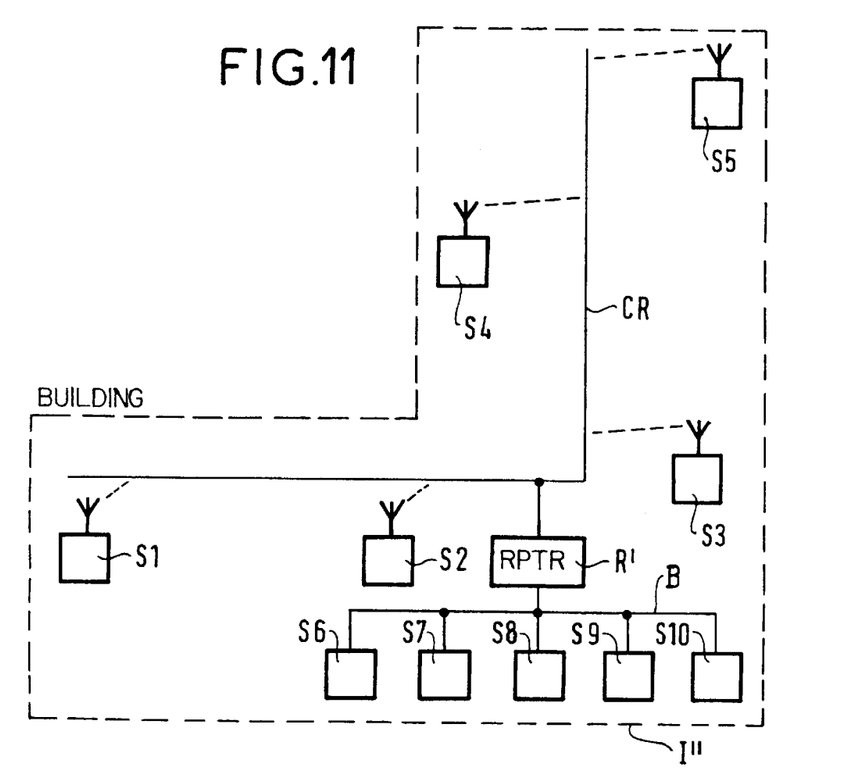
FIG. 11 is a block diagram of another embodiment of network in accordance with the invention including a wireless subnetwork and a cable subnetwork.

FIG. 11 is a block diagram of another embodiment of network in accordance with the invention including a wireless subnetwork comprising stations S1, . . . , S5 and a cable subnetwork comprising stations S6 through S10. The network includes a repeater R' which is interfaced to a radiating cable CR and to a bus B.

Figure 12:
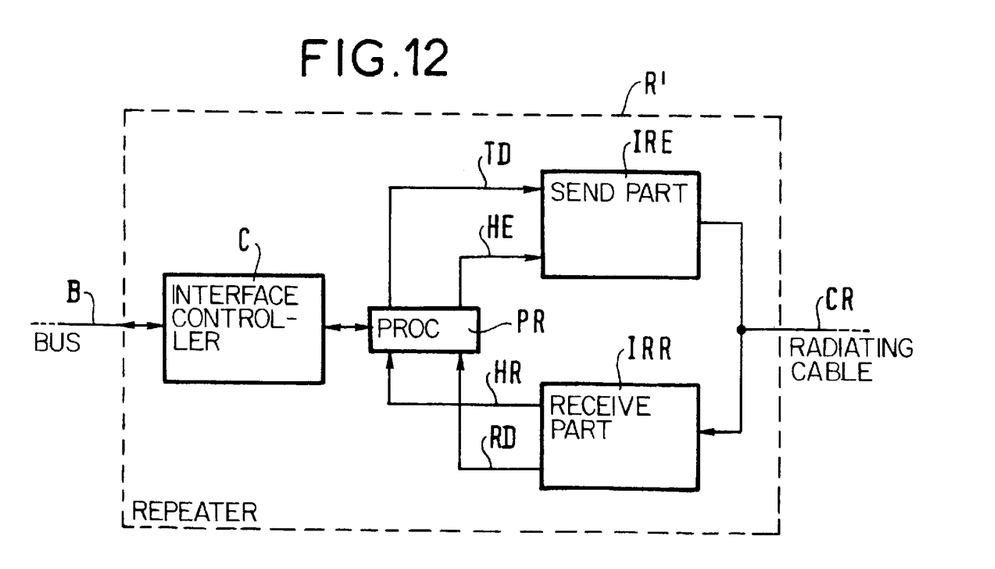
FIG. 12 is a block diagram of the repeater used in this latter embodiment of the invention.

FIG. 12 is a block diagram of the repeater R' used in this embodiment of the invention. The repeater R' includes the same items as the repeater R shown in FIG. 9 and described previously, plus an interface controller C connected to the bus B and to the processor PR described previously. For example, the cable subnetwork uses an IEEE 802.3 protocol and the interface controller C applies this protocol. The repeater R' is seen by the cable subnetwork as a particular station including an interface controller C which accepts messages addressed to stations S1 through S5 and retransmits them to the processor PR so that they are sent over the radiating cable CR. Reciprocally, messages received over the radiating cable CR and passing through the processor PR are supplied to the interface controller C so that it can determine if the destination station is one of the stations S6 through S10 of the cable subnetwork. If so, the message is retransmitted by the interface controller C over the bus B.

There is claimed:

1. Wireless local area network including a plurality of stations each including means for sending and receiving radio messages and a repeater for retransmitting each message sent by a station, said repeater being connected to a radiating cable passing near all said stations, wherein said repeater adds to each message retransmitted at least one indication that said message has passed through said repeater and each station includes means for ignoring messages that do not contain an indication that the message has passed through said repeater.

2. Network according to claim 1 wherein each station includes means for sending each message with a predetermined duration, said repeater includes means for retransmitting each message after a predetermined time delay at least equal to the fixed message duration, and each station includes means for comparing a message received from said repeater after sending a message with the message that it sent and sending again the message that it sent with a pseudo-random time-delay if the comparison does not indicate that said messages are identical.

3. Network according to claim 1 wherein said repeater includes means for adding to each retransmitted message binary information to control at least one station and each station includes means for receiving binary control information added to a message retransmitted by said repeater.

4. Network according to claim 1 wherein said repeater includes means for sending service messages to stations at its own initiative and each station includes means for executing an instruction contained in a service message addressed to it.

5. Network according to claim 4 wherein each station includes means for sending at a variable power level controlled by service messages sent to it by said repeater and said repeater includes means for determining said power in such a way as to achieve a given quality of transmission between said repeater and said station.

6. Network according to claim 1 wherein said repeater further includes means for connecting it to at least one cable local area network, said means sending at least some of the radio messages sent by said stations on said cable local area network, in the format corresponding thereto, and retransmitting messages from said cable network on said radiating cable.

7. Network according to claim 3 wherein said repeater includes means for adding to each message a binary word specific to said network and all said stations include means for detecting said binary word in each message received and ignoring messages which do not include the binary word specific to the network of which they are part.

8. Network according to claim 1 wherein said repeater receives and retransmits messages from stations in the same frequency band in half-duplex mode.

9. Network according to claim 7 wherein said repeater and all said stations include means for sending in all of said bandwidth using a spectrum spreading method.

10. Network according to claim 9 wherein said repeater and said stations include, for sending:
- a source delivering bursts of high-frequency signal having a predetermined duration and a Gaussian form of amplitude modulation;
- a Barker sequence generator processing said bursts delivered by said source;
- means for coding messages to be transmitted in the form of a binary signal having a fixed bit period and a fixed number of bits, said binary signal controlling said source; and including, for receiving:
  - a correlator whose weighting coefficients are binary values ±1 constituting a Barker sequence complementary with that used for sending; and
  - means for decoding messages received using a signal supplied by said correlator.

11. Network according to claim 10 wherein said Barker sequence generator for sending and said correlator for receiving each comprise a surface acoustic wave device including electrodes whose geometrical characteristics correspond to the binary values of said Barker sequence.

12. Network according to claim 1 wherein each station includes means for calculating and inserting into each message that it sends at least one error detecting bit and means for calculating an error detecting bit from each message that it receives, comparing it to that contained in said message, and if necessary sending a message requesting repeating of the last message sent to it, if the comparison indicates that this latter message includes an error.

13. A station for a wireless local area network having a repeater connected to a radiating cable Passing by a plurality of stations in said wireless local area network, comprising:
- means for sending and receiving radio messages; and
- means for ignoring messages, received by said means for sending and receiving radio messages, that do not contain an indication that the message has passed through said repeater of said wireless local area network.

14. A repeater for a wireless local area network having said repeater connected to a radiating cable passing by a plurality of stations in said wireless local area network, comprising:
- means for retransmitting each message sent by said plurality of stations; and
- means for adding to each message retransmitted at least one indication that said message has passed through said repeater, said means for adding being connected to said means for retransmitting.

15. Network according to claim 1, wherein the messages retransmitted by said repeater are transmitted at the same frequency as the message sent by said stations.

16. Network according to claim 1, wherein the indication that said message has passed through said repeater includes additional bit data information inserted into said message sent by said station.

* * * * *